United States Patent [19]

Walters

[11] Patent Number: 4,474,137

[45] Date of Patent: Oct. 2, 1984

[54] BROILER REARING UNIT

[75] Inventor: Anthony G. Walters, Shrewsbury, England

[73] Assignee: Salopian Industries (Metals) Limited, Shrewsbury, England

[21] Appl. No.: 403,917

[22] Filed: Jul. 30, 1982

[30] Foreign Application Priority Data

Aug. 12, 1981 [GB] United Kingdom ............... 8124634

[51] Int. Cl.³ ...................... A01K 31/06; A01K 31/04
[52] U.S. Cl. ........................................ 119/18; 119/22
[58] Field of Search .............................. 119/17, 18, 22

[56] References Cited

U.S. PATENT DOCUMENTS

| 2,061,712 | 11/1936 | Martin | 119/18 X |
| 3,785,345 | 1/1974 | Rhinehart et al. | 119/18 |
| 3,900,006 | 8/1975 | Shockley, Jr. | 119/18 |
| 3,948,219 | 4/1976 | Groppel | 119/17 |

*Primary Examiner*—Hugh R. Chamblee
*Attorney, Agent, or Firm*—Schrivener, Clarke, Schrivener and Johnson

[57] ABSTRACT

A broiler rearing unit comprises an elongate housing which defines a continuous elongate space able to accommodate birds from chicks through to maturity and allow them to exercise, and having a floor 9 which extends longitudinally of, and is movable along, the space so that birds can be transported on the floor to one end of the space for removal from the housing. The floor comprises a series of load-supporting elements 10 which are releasably connected end-to-end and can be successively detached from the remaining elements when they reach the end of the space. Each load-supporting element in turn has drive imparted to it, suitably by a motor driven portable drive assembly, as it reaches the leading end of the floor and the drive is transmitted to the other elements of the floor through the connections between the elements. The supporting surface of each load-supporting element is formed by a perforate, flexible, moulded plastics mat 11 which is supported in tension over a rigid framework 12 including side bearers 15 provided with hooks 20 and keeper pins 21 by means of which the elements are releasably connected together.

20 Claims, 12 Drawing Figures

BROILER REARING UNIT

This invention relates to broiler rearing units for use in the raising of chickens and other poultry for human consumption.

Most commonly broiler chickens and other poultry are reared commercially from one day old on the floor in a broiler house. The lighting and ventilation rates in the house are controlled. For the first few days the birds are restricted to certain areas of the building close to heaters, waterers and feeding appliances. Barriers are placed around the birds to control their movement, and these have to be moved as the birds grow. The optimum density of the birds as they approach maturity, usually taken as about 1.80 kg live weight, is twenty-two birds per square meter. Whilst a good quality of bird can be produced on the floor, there is a high ammonia content in the air, birds eat from their own droppings, and as the disease risk is high there is substantial expense in providing preventative medication for controlling disease. There is also a high cost in providing and removing litter from the houses between the batches of birds. A further disadvantage is that because of the density of the birds and the relatively large area of floor on which they are accommodated, if any birds should die or fall sick they may not be readily spotted in the litter on the floor so that they may lie on the floor for some time before they are removed, which again is undesirable.

The working conditions for the poultryman and the living conditions for the birds cannot be considered satisfactory. When the birds are finally harvested from the broiler house, they have to be picked up by hand and loaded into a transporting vehicle. This can result in damage to the wings and legs of the birds, which is undesirable because of the suffering caused to the birds and because the birds may be rejected during processing at an eviscerating plant.

As an alternative to rearing birds on the floor, various types of broiler cages have been proposed. These enable a greater density of birds to be reared for a given floor area than has been possible with the floor rearing method because the cages can be arranged in tiers. The broiler cages have been substantially similar to those used to accommodate egg laying hens in battery cage systems, each cage being restricted in size and usually accommodating up to twelve mature birds in very cramped conditions. Having the birds in cages facilitates management of the birds during the growing period but handling the birds when removing them from the cages can cause just as much damage to them as with birds on the floor, especially when the birds have to be removed through restricted openings at the fronts of the cages. Because movement in the cages is so restricted the birds get very little exercise and as they approach maturity they find difficulty in standing. As a result of then lying on the floors of the cages the birds are likely to suffer from blisters on their breasts due to feather follicle damage and the rigidity of and loading on the breasts whilst they are inactive. This again is undesirable because of the suffering and stress caused to the birds and the reduced quality, and hence profitability, of the birds produced.

The present invention seeks to overcome at least some of the aforementioned problems.

The present invention consists in a broiler rearing unit comprising an elongate housing which affords a continuous elongate space enclosed by walls extending longitudinally of the housing and which space is able to accommodate a plurality of birds from chicks through to maturity, is of proportions which enable the birds, at all sizes, to exercise themselves by moving their wings and moving to and fro along the space, and has a floor which extends longitudinally of and is movable along the space and comprises a plurality of load-supporting elements releasably connected end-to-end which can be moved successively to one end of the housing where they are detachable from those of the elements remaining in the accommodation space.

The broiler rearing unit may extend for any desired length to suit the requirements of the intended installation. It may, for example, extend for substantially the full length of the house in which the unit is installed for use, and thus the elongate accommodation space for the birds extends continuously for substantially the length of the house. It is envisaged that units in accordance with the invention may be installed in houses up to 150 meters long, or possibly even longer. Accordingly the unit can provide a very considerable accommodation space for the birds to move about in. Even in shorter installations the accommodation space allows the birds to get plenty of exercise which enables them to develop and retain the strength in their legs necessary to carry their weights right through to the size at which the birds are ready for disposal. There is far less restriction than in the broiler cages described above. The birds may move in the accommodation space at their own discretion and exercise themselves in a substantially natural manner by virtue of the fact that they can move their wings and move along the space.

Whilst the accommodation space in the unit provides the birds with ample room to move about in, removal of the birds from the space when they are mature and ready for disposal is not the problem it is with collecting birds on the floor of a broiler house or from the known broiler cages. Removal of the birds from the accommodation space is facilitated by the provision of the movable floor. The floor can be operated to move the birds in a body to one end of the unit where they can be removed from the unit. The birds may be caught by hand at the end of the unit and loaded directly into a suitable container immediately adjacent to the point at which the birds are taken off the movable floor, or because the floor elements can be detached at the end of the housing the birds may be moved, still on the detached elements, into a container, or on to a conveyor for transporting away from the unit.

The unit may be installed with other similar units in tiers or terraces, possibly three or four high, in the manner of cages for egg laying hens in a battery system. Each unit may extend the full length of the tier or terrace. It may be arranged back to back with another similar unit.

The depth from front to back of the accommodation space in the unit is preferably such that any sick or dead birds can be reached by hand and removed from the front of the unit. The limited depth of the accommodation space also facilitates inspection of the birds in the unit because they can all be readily viewed from the front of the unit.

The front wall of the unit may be of wire bar or mesh construction, at least in part. Preferably access openings are provided in the front wall normally closed by gates, conveniently of wire bar or mesh, which may be opened or removed so that entry can be gained into the space.

The unit may be of a modular construction which enables the unit to be made readily of any desired length, the module components connecting so as to provide the continuous accommodation space along the unit whatever length it may be.

When installed for use the unit is provided with a feeding trough extending for the length of the accommodation space, or other suitable feeders, and waterers so that the birds have these facilities close to them, and preferably they can reach them with a minimum of competition.

It is desirable for the load-supporting elements of the floor to be perforate, the perforations being such that an adequate surface is provided for birds to stand on from chicks onwards. The supporting surface of each floor element may be made of plastics material, and it may be of a mesh or mesh-like structure. Each element preferably comprises a perforate plastics mat on a supporting open framework. Conveniently each element is of a size which enables it to support up to seventy-five day old chicks or fifteen mature birds ready for disposal. The elements may be of other sizes, if preferred. Ideally the floor elements are connected together with minimal gaps between them so that the floor surface they provide in combination for the birds is substantially continuous for the length of the accommodation space.

The perforate floor formed by the load-supporting elements allows droppings from the birds in the housing to pass out through the floor. The droppings may be collected on a tray or trays, or a belt, extending below the floor longitudinally of the housing, or in a pit provided below the housing when installed for use, or they may be collected in another suitable manner.

The load-supporting elements preferably are arranged to pass out from the one end of the housing before they are detached from the remaining elements. At the end at which the elements leave the housing they may pass into or may be adapted to form the floors of containers which receive birds from the housing for transporting them away from the unit. The connection between the elements is conveniently such that they automatically separate upon leaving the housing and moving into a different plane from the elements still in the accommodation space.

Drive may be applied to the floor to move the load-supporting elements along the housing either by manually operated means, or by power driven means. The drive may be provided at one end of the housing, conveniently the end towards which the elements are moved, and it may be applied at the longitudinal sides of the floor, or at or adjacent the central longitudinal axis of the floor. It will be appreciated that to avoid undue additional friction between the load-supporting elements of the floor the drive should be applied evenly with respect to the width of the floor so that it will not pull to either side as it travels along the housing.

The unit now provided is preferably constructed so that it can be used for rearing birds from day old through the maturity. Heat has to be provided to keep the growing birds at the desired temperature. At one day old the birds require a temperature of 32° C. and it is the usual practice to reduce the temperature thereafter by 0.55° C. each day until an optimum temperature of 22° C. is reached which is then maintained until the birds are taken away for slaughter. As the birds grow the heat they produce themselves increases so that the heat which has to be provided decreases. Since the birds initially occupy considerably less space than when they are mature, only part of the length of the present housing needs to have heat applied to it to satisfy the requirements of the birds. Normally it is sufficient for only about 25% of the length of the housing to be heated. The birds are naturally attracted to where the heat is and they gather in the heated region when they are very young. As the birds grow the available space in the housing enables them to spread themselves out and move away from the heated region. It will be understood, therefore, that as compared with previous systems in which heat has been provided throughout a broiler house to satisfy the requirements of the birds, the use of the present unit can considerably reduce the heating requirements in a broiler house, and hence enables a substantial saving in heating costs to be achieved. One previously adopted arrangement for reducing heating costs involved putting the birds initially into a brooding unit, which would normally be filled almost to capacity with the birds, and subsequently removing up to one third of them when they were partly grown so that they would not become overcrowded. The use of the present unit in the manner described for rearing birds from day old to maturity has the advantage that such handling of the growing birds is avoided.

It will be understood from the foregoing that the unit now provided can afford several advantages over the known poultry husbandry.

An embodiment of the invention will now be described by way of example with reference to the accompanying drawings in which.

The broiler rearing units in this embodiment are intended to house broiler chickens.

Figure 1:
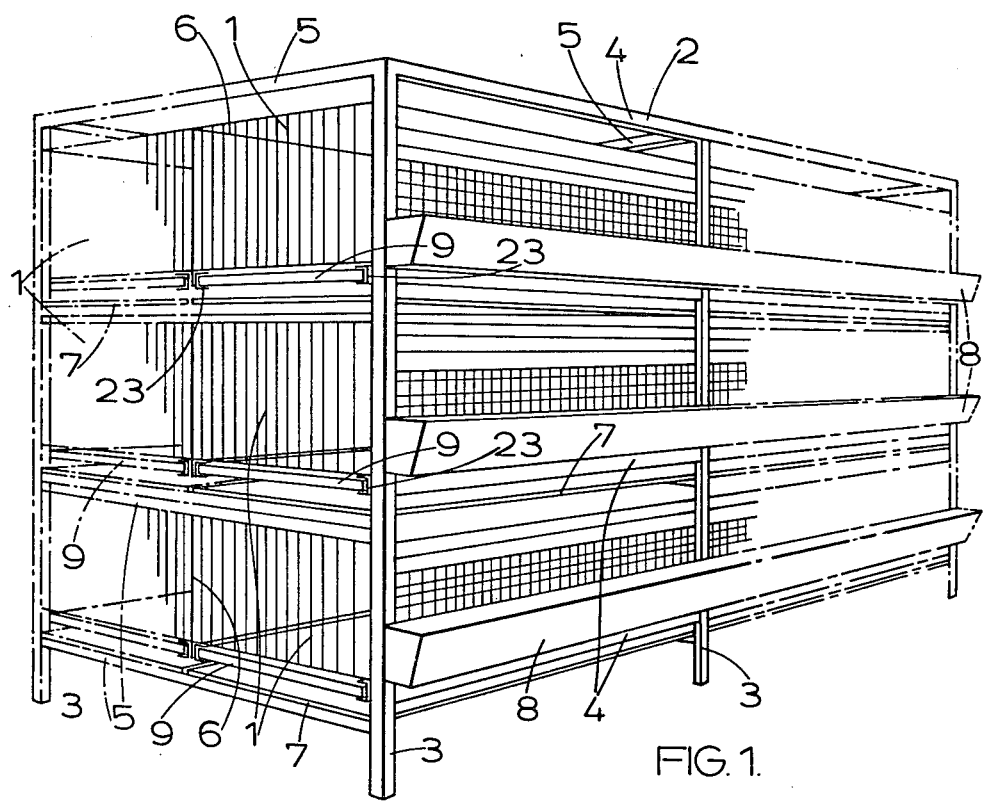
FIG. 1 is a diagrammatic perspective view of a tiered row of broiler rearing units in accordance with the present invention.

Referring to FIG. 1, the tiered row of units comprises six units disposed in two back-to-back lines of tiers of three units. Each unit extends the full length of the row.

The units are supported on an open frame structure 2 comprised of upright members 3 which stand on the ground, horizontal members 4 extending longitudinally of the units and transverse members 5 extending horizontally transversely of the units. These frame members 3, 4 and 5 are all made of galvanised steel L-section, or channel section. Each unit has barred front, back, top and end walls made from welded galvanised steel rods and constructed in substantially similar manner to those of known rows of battery cages for egg laying hens. The walls define a continuous space extending for the length of the unit to accommodate the chickens. There is provision, not shown, at the front wall for access into the unit if required, for example to reach a sick or dead chicken when the unit is in use. Additional upright reinforcing members may be provided in the front and back walls if required. At least one of the end walls is openable. The units which are back-to-back share a common back wall 6. The height of each unit is such as to allow mature birds to stand upright and move their wings, and the depth between its front and back walls is such that mature birds cannot normally assemble more than two or three deep across the unit. Supported by the frame structure 2 longitudinally below each unit is a tray 7 for receiving droppings from the birds in the units when the units are in use. Scraper cleaning apparatus of known kind, not shown, is arranged to travel along the tray to clear the droppings from the tray. A feed trough 8 extends along the front of each unit. Food is supplied to the trough in known manner by a hopper, not shown, which travels forwards and backwards along the unit. The hoppers serving the units are all carried in known manner by a carriage, not shown, which runs on rails, not shown, supported by the frame structure above the uppermost tiers of units of the row. Suitable drinkers, not shown, are provided at spaced intervals along the length of each unit, the spacing and positioning of the drinkers being variable to suit the requirements of the birds in the units as they grow.

Figure 2:
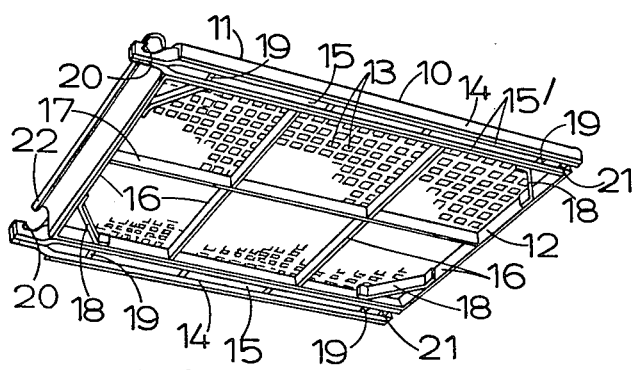
FIG. 2 is an underneath perspective view of a load-supporting element of a floor of one of the units.
Figure 3:
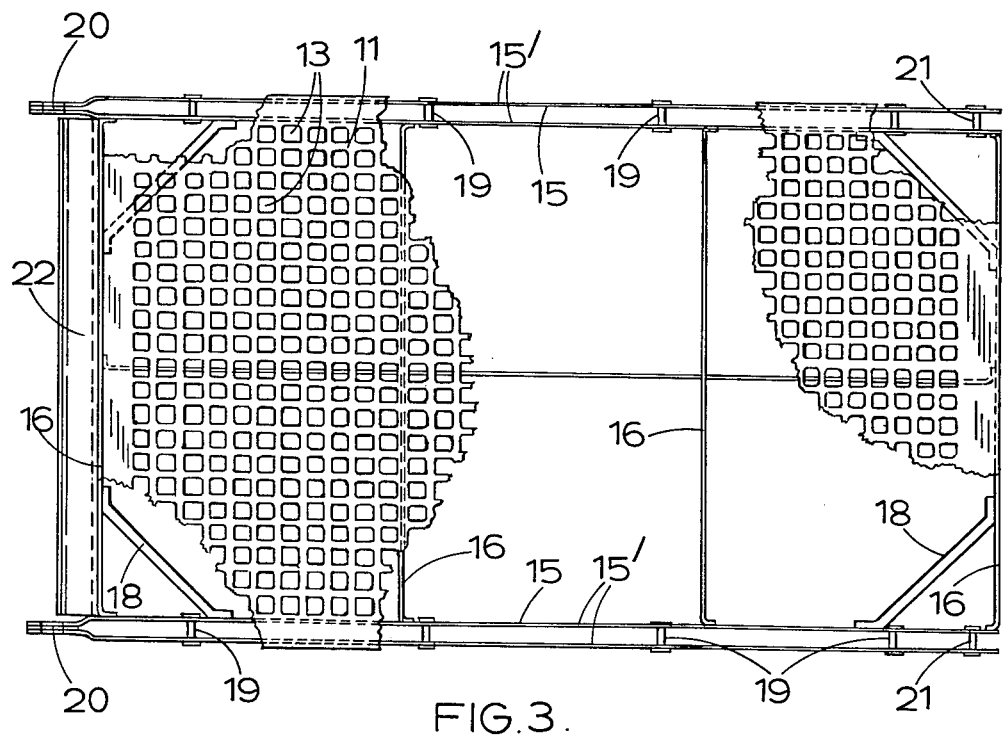
FIG. 3 is a plan view of the load-supporing element.
Figure 4:
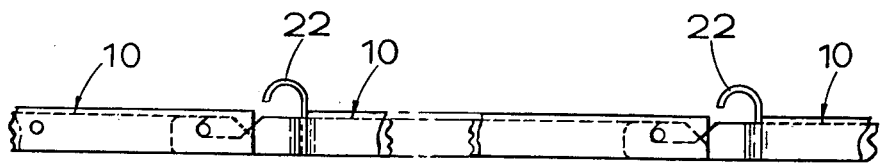
FIG. 4 is a side view of part of the floor.

Each unit has a floor 9 extending for the full length of the unit. The floor 9 consists of a series of load-supporting elements 10 connected end-to-end, FIG. 4. The widths of the elements correspond substantially to the depth of the unit between its front and back walls. Each load-supporting element 10, as shown in FIGS. 2 and 3, comprises a substantially planar rectangular moulded plastics mat 11 supported in tension over a framework 12 of rigid metal members. The mat 11 is perforated with square holes 13 having rounded corners, and has depending flanges 14 along its opposite longitudinal sides. The framework 12 comprises two side bearers 15 extending for the length of the mat alongside the inner faces of the depending flanges 14 to which they are secured, cross bearers 16 secured to and extending transversely between the side bearers at the opposite ends of the mat 11 and at intermediate positions between the ends of the mat, an intermediate bearer 17 extending centrally longitudinally of the mat and connected to the cross bearers 16, and bracing bearers 18 extending diagonally between the side bearers and the cross bearers at the ends of the mat. The side, cross and intermediate bearers are arranged so as to share the load which the mat supports in use and generally balance the load evenly over the load-supporting element 10. Typically, each load-supporting element is designed to support up to 34.00 kg weight of birds in use.

The moulded plastics mat 11 of each load-supporting element 10 is flexible and is able to give to some extent in hammock-like fashion between the side, cross and intermediate bearers of its supporting framework 12, so that when birds do either sit or rest the mat is able to conform generally to the shape of the birds' breasts in contact with it and the point loads on the breasts are thus reduced. Consequently the risk of breast blisters is greatly reduced.

The side bearers 15 of the framework 12 of each load-supporting element 10 each comprise two strips 15' secured in spaced parallel, side-by-side relationship by pins 19, which also serve as drive pins as will be described below. At one end of the framework the strips 15' of each side bearer 15 converge and are formed to provide an upwardly directed hook 20. At the opposite end a keeper pin 21 is secured to and extends between the strips 15'. The load-supporting elements 10 are connected together to form the floor by engaging the hooks 20, from below, with the keeper pins 21 of the side bearers 15 of the adjacent elements longitudinally of the floor. The engagement between the hooks and the keeper pins allow a small amount of play (in practice approximately 2 cms) between them longitudinally of the floor. At one end each load-supporting element has a handle 22 of generally inverted U-shape which extends substantially across the width of the element and projects above the level of the mat 11. The handle 22 facilitates manual carrying of the element when it is not inserted in a unit as part of the floor. Also when the element is forming part of the floor the handle substantially covers the space between the element and an adjacent one so that young chicks cannot get trapped in the space, and it discourages older birds from sitting across the two elements, which could be a problem when birds are being removed from the unit on the floor.

The load-supporting elements connected together to form the floor of a unit are supported in position at the unit by parallel channel-section guides 23 which extend for the length of the unit and are arranged with their open sides facing to receive the opposite sides of the floor. Plastics, for example nylon, runner strips, not shown, are secured on the insides of the bottom flanges of the guides for the side bearers 15 of the frameworks 12 of the load-supporting elements to run along in the guides with minimal friction. The guides 23 are fixed to the frame structure 2 supporting the units.

The floor of each unit is adapted to be driven to move its load-supporting elements longitudinally along and out of the unit when required. The drive is applied to one end of the floor, adjacent the end of the unit towards which the floor is to be moved. That end of the unit at least has the removable end wall. Preferably the drive is provided by a portable drive assembly, not shown, which is motor driven, electrically or by an internal combustion engine, and includes a speed control and which is adapted to be releasably connected to drive the floor of any one of the units when the floor of that unit is required to be moved. The drive assembly may be positioned inside or outside the house in which the units are installed for use, suitable transmission means taking the drive to the floor which is to be driven.

Figure 5:
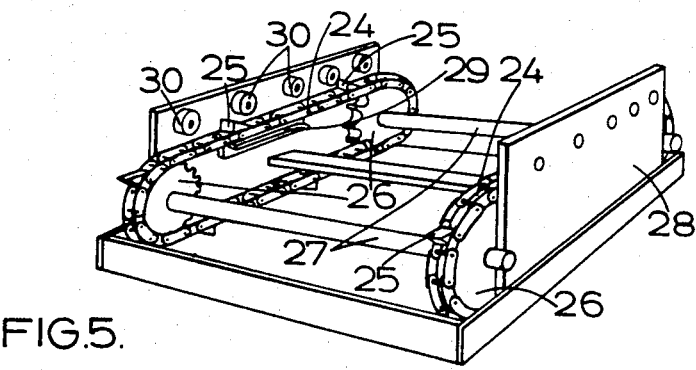
FIG. 5 is a perspective view of a transmission unit for transmitting drive to the floor of a unit.

The drive transmission, which operates to move the floor of one unit at a time, includes a transmission unit as shown in FIG. 5 of the accompanying drawings. For use the transmission unit is positioned at the end of the row of units towards which the floors are to be moved, and it is set at the required height to drive the floor of any one of the units by means of a winch, not shown. The transmission unit itself comprises a pair of endless chains 24 carrying dogs 25 at spaced intervals along their lengths and engaged with two pairs of sprockets 26 mounted on two parallel shafts 27 (one pair of the sprockets adjacent either end of the shafts) supported horizontally by and positioned in bearings, not shown, on a chassis 28. The distance between the chains corresponds substantially to the lateral spacing apart of the side bearers 15 of the frameworks 12 of the load-supporting elements 10 of the floor. Between the pair of sprockets 26 the top run of each chain 24 passes over a support 29 on the chassis 28 which prevents that run from sagging. Spaced above and parallel to the top run is a row of rollers 30, also mounted on the chassis. The distance between the rollers and the top run of the chain is complementary to the dimension from the top surface of the mat 11 of each load-supporting element to the undersurfaces of the flanges 14 of the mat and the side bearers 15. The transmission unit is located underneath the floor at the one end of the broiler rearing unit with the chains 24 extending lengthwise of the floor and positioned to be immediately below the side bearers 15 of the load-supporting element which is at that end of the floor. The sides of the end load-supporting element are engaged under the rollers 30 which hold the side bearers in close contact with the chains. The dogs 25 drivingly engage with the drive pins 19 of the side bearers. Drive from the power source is taken to the shafts 27 and thus to the chains 24, thereby to drive the floor through the engagement of the dogs with the drive pins.

When assembling the floor of each broiler rearing unit, the load-supporting elements 10 are preferably fed into the guides 23 from the end of the unit at which the transmission unit is located. As the elements are fed into the guides they are successively connected together by means of their hooks 20 and keeper pins 21, the elements being arranged so that the hooks are towards the trailing end of the floor. Because of the play allowed between the hooks and the keeper pins the load-supporting elements close up closely to one another as they are pushed along the guides towards the opposite end of the unit. Thus, when drive is applied to the completed floor through the transmission unit there is some initial delay before the whole floor starts to move as the play between the load-supporting element is progressively taken up. This avoids a sudden jolt on the floor which would disturb the birds when the drive is started.

The broiler rearing units described are designed to accommodate chickens from day old to maturity. Food is supplied to the troughs in front of the units automatically from the hoppers which are arranged to travel any required distance along the row of units from a rest position. For example, when day old chicks are occupying only parts of the lengths of the accommodation spaces in the units the hoppers may be arranged to travel only along those parts of the units to deposit food into the troughs and then back to their rest positions. As the birds grow and occupy more of the lengths of the accommodation spaces the hoppers can be set to travel further along the units, as necessary. The hoppers are replenished with feed at the rest positions by an overhead supply auger or other suitable means.

When the chickens in a unit are mature and are to be removed from the unit the floor of that unit is driven to take the chickens to and out of the one end of the unit through an opening in the end wall which is normally closed off but is opened for the removal operation. It is desirable for the chickens to be removed in a dim light so that they are disturbed as little as possible. As each load-supporting element in turn reaches the transmission unit the drive to the floor is taken up by that element so that it pulls the trailing element along with it, and pushes the element, or elements, in front of it away from the unit. Beyond the broiler rearing unit the elements are successively disconnected from the one behind by being arranged to drop to a slightly lower level, which is sufficient to allow the hooks 20 to free themselves from and drop out of engagement with the keeper pins 21 of the element behind. The elements may drop onto a conveyor to be taken away from the house with the chickens on them, for example to a vehicle which is to be loaded with the chickens to take them to an eviscerating plant. Alternatively, the chickens may be caught by hand as they emerge from the end of the unit to be put into crates, loaded onto a vehicle or otherwise dealt with as required. A further possibility is for each load-supporting element, with the chickens still on it, to enter into a crate or cage as it leaves the end of the unit for the chickens to be transported away from the broiler house.

Whilst in this embodiment the drive to each floor is applied by the transmission unit to the two sides of the load-supporting elements, it will be appreciated that the transmission unit and load-supporting elements may be adapted so as to have the drive applied along or near to the central longitudinal axis of the floor. The alternative arrangement may be more convenient in some installations to reduce frictional loading on the floor which might otherwise occur if it is difficult to install the broiler rearing unit without some deviation from the preferred truly straight and horizontal, as might be the case when the unit is of substantial length.

An alternative, modular manner of construction of the broiler rearing units will now be described with reference to FIGS. 6 to 10 of the accompanying drawings. As before, a tiered row of units is provided in which units are disposed in two parallel lines of tiers, there being tiers of three, four or more units in each line, making respectively six, eight or more units, in the row.

Figure 6:
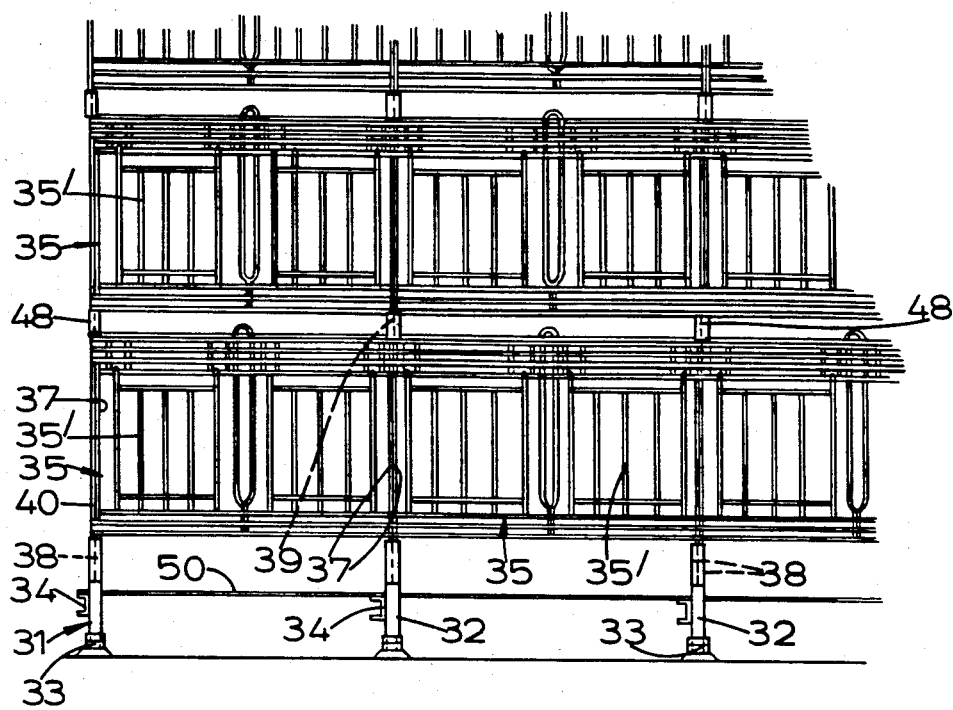
FIG. 6 is a fragmentary front view showing an alternative construction of the broiler rearing units.
Figure 7:
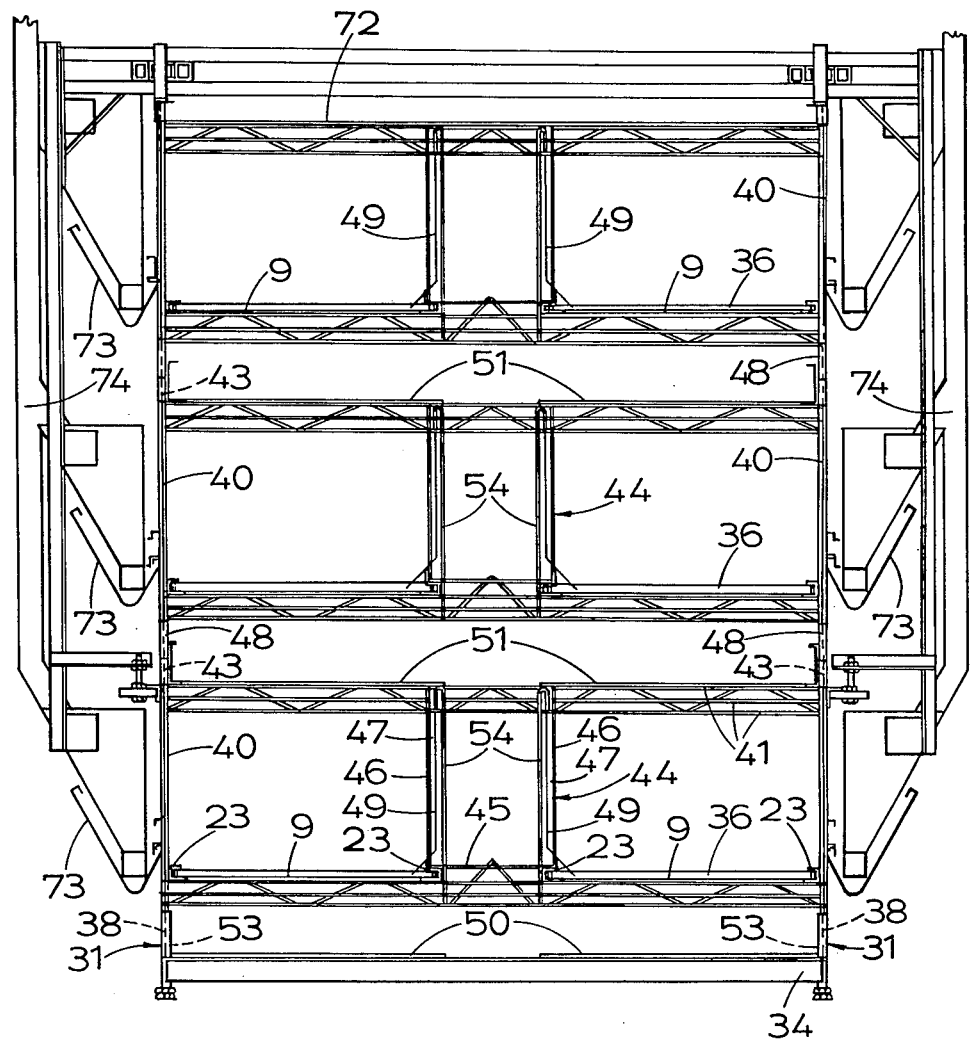
FIG. 7 is a simplified end view of the units of FIG. 6 with end walls of the units removed.
Figure 8:
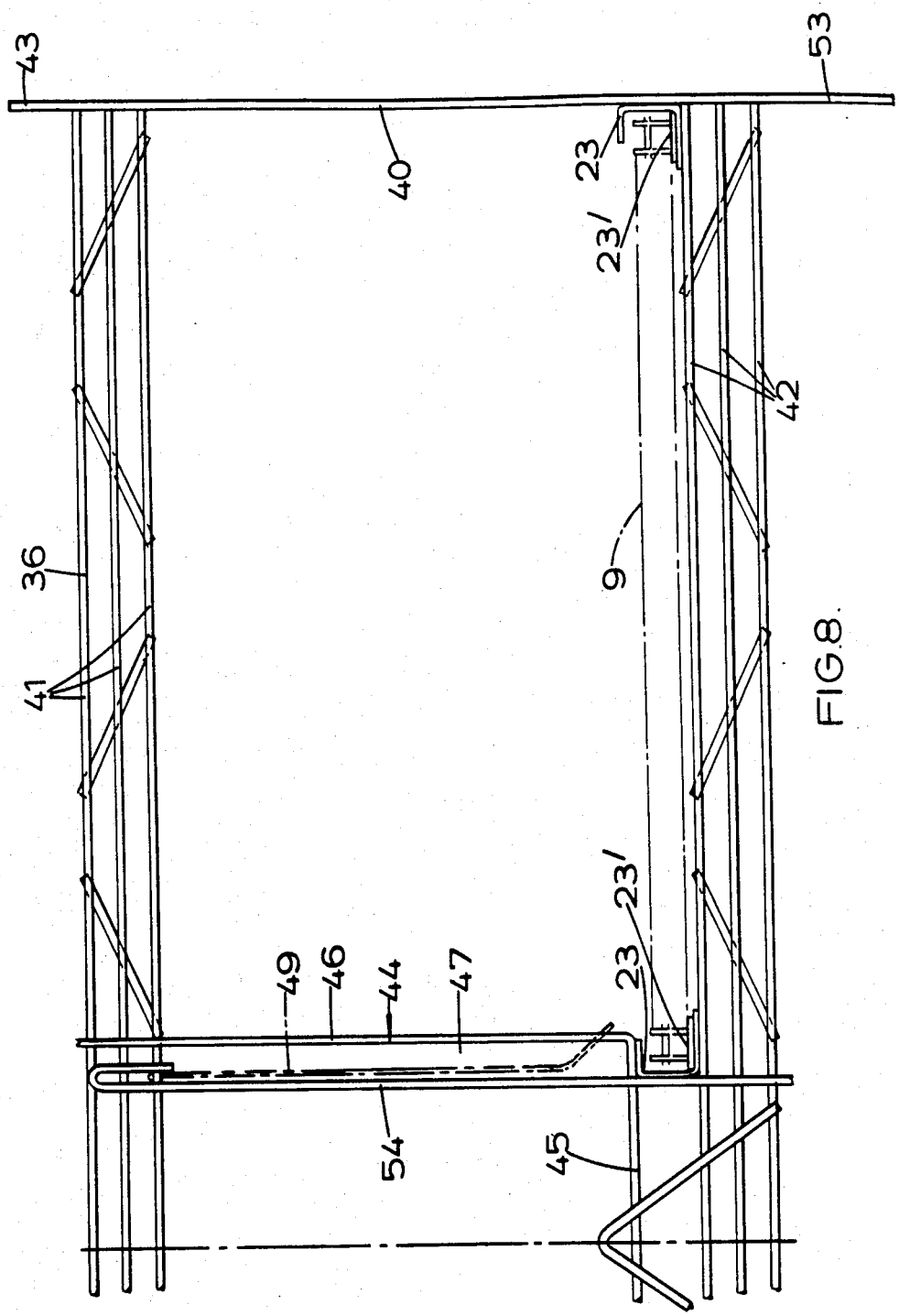
FIGS. 8 and 9 are enlarged elevational views respectively of parts of a cross frame section and a front wall section used in the alternative construction.
Figure 9:
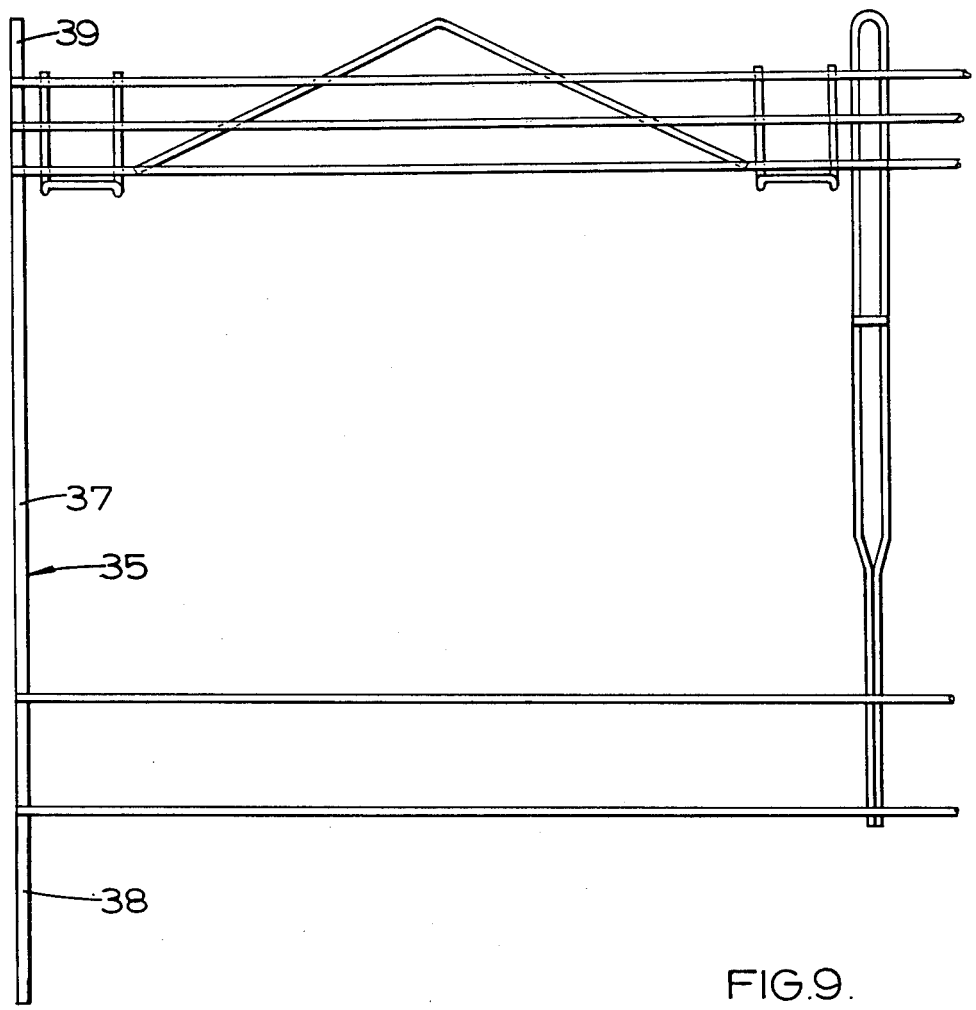

The units are supported by and built up on a series of floor supports 31, FIGS. 6 and 7 positioned at regularly spaced intervals (typically at 1 meter intervals) along the row. Each floor support comprises a pair of tubular legs 32 having height adjustable feet 33 and being connected by a horizontal-cross member 34 of channel-section joined to the lower halves of the legs at positions spaced above the feet. The floor supports 31 are arranged transversely of the row and the cross members 34 extend across the combined front-to-back depths of two back-to-back lines of broiler rearing units. The units themselves are built-up from a series of front wall sections 35 and cross frame sections 36 all constructed from galvanised steel wire. The front wall sections 35, FIGS. 6 and 9, are vertically and horizontally barred structures with removable wire bar or mesh gates 35' hung on them and including upright end rods 37 which have depending bottom locating parts 38 and upwardly projecting upper locating parts 39. The cross frame sections 36, FIGS. 7 and 8, are each rectangular with upright side rods 40, which form the shorter sides of the rectangle, and horizontal top and bottom cross rods 41 and 42 respectively. The side rods 40 have depending bottom locating parts 53 and upwardly projecting upper locating parts 43 similar to the respective locating parts 38 and 39 of the end rods 37 of the front wall sections 35. Two intermediate upright rods 54 extend between the top and bottom cross rods 41, 42 of each cross frame section at positions near to but at opposite sides of the central vertical axis of the cross frame section. A length of wire 44 bent to U-shape is secured across the two intermediate upright rods 54 so that the horizontal base part 45 of the U is spaced just above the uppermost bottom cross rod 42 and is fixed to the intermediate upright rods, and the upright limbs 46 of the U extend parallel to the respective intermediate upright rods 54 and are secured at their upper ends to the top cross rods 41, the arrangement being such that between each intermediate upright rod and the adjacent upright limb 46 a narrow, vertically extending opening 47 is defined.

Figure 10:
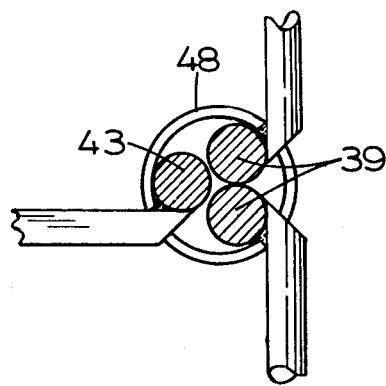
FIG. 10 is an enlarged fragmentary horizontal section showing a connection between front wall and cross frame sections.

The two units forming the two lines of the bottom tier are made up by assembling a series of front wall sections 35 on the floor supports 31 so that they span the latter in two continuous lines at opposite ends of the floor supports. The front wall sections are located on the floor supports by inserting the bottom locating parts 38 into the top ends of the legs 32 of the floor supports. Stops, not shown, inside the legs determine the extent to which the locating parts 38 can be inserted into the legs. Each front wall section spans two adjacent floor supports. The front wall sections of the two lines fit closely together, those of one line forming a continuous front wall of one of the units of the bottom tier and those of the other line forming a continuous front wall of the other unit of the tier. Next cross frame sections 36 are assembled on the floor supports, one to each floor support extending longitudinally of the floor support and hence transversely between the two lines of assembled front wall sections. These are also located on the floor supports by inserting their bottom locating parts 53 into the top ends of the legs 32. Connector tubes 48, FIG. 10, are then fitted over each group of three upper locating parts 39, 43 presented where two front wall sections and a cross frame section meet, and over each pair of upper locating parts where a front wall section and a cross frame section meet at the opposite ends of the two lines.

Sheet metal panels 49, FIGS. 7 and 8, are located in the openings 47 of the cross frame sections and form continuous back walls of the two bottom units. There is a space between the back walls of the two units.

Trays 50 for droppings from the bottom units are provided by sheet metal, plastics or asbestos sheets supported on the cross members 34 of the floor supports 31, as shown in FIG. 7, being spaced below the bottom cross rods 42 of the cross frame sections.

Two of the channel-section guides 23 for the load-supporting elements of the floor of each bottom unit are secured on the cross frame sections, FIG. 8. One guide 23 is secured on the bottom cross rods 42 adjacent to the upright side rods 40 at the front wall of the unit, and the other guide is secured on the bottom cross rods next to the intermediate upright rods 54 directly underneath the openings 47 in which the back wall panels 49 of the unit are located. The guides 23 are secured with their open sides facing, and each guide has a plastics runner strip 23' fixed on the inside of its bottom flange for the load-supporting elements to run on with minimal friction.

Further trays 51 are supported on the top cross rods 41 of the cross frame sections and close off the tops of the two bottom units. These trays collect droppings from the next tier of units to be assembled over the bottom units.

The cross frame sections leave a clear continuous space extending for the length of each unit. Barred end wall sections, not shown, are detachably secured to the cross frame sections at the opposite ends of the unit to close off the ends of the unit.

The next tier of units above the two bottom units, and each successive tier, is built up in similar manner, the front wall sections and cross frame sections being located by inserting the bottom locating parts 38, 53 into the connector tubes 48. The bottom cross rods 42 of the cross frame sections of the tier are spaced above the trays 51 sufficiently to provide clearance for cleaning scrapers to travel along the trays to clear droppings off the trays. The clearance is determined by the lengths of the connector tubes 48 used and/or by the lengths of top and bottom locating parts 39, 43 and 38, 53 respectively. Again there is a space between the back walls of the units of each tier, as there is between the back walls of the units of the bottom tier.

A sheet metal, plastics or asbestos cover 72 is supported over the topmost tier of units by the top cross rods 41 of the cross frame sections of those units.

Feed troughs 73, FIG. 7, and waterers, not shown, are mounted on the structure formed by the assembled front wall and cross frame sections. Food is supplied to the troughs 73 by travelling hoppers 74 of known kind which travel forwards and backwards along the tiered units.

The floors 9, FIG. 7, of the units formed by the load-supporting elements are assembled in the manner previously described in the guides 23, and may be driven in similar manner.

It will be understood that the broiler rearing units may be readily built up to any desired length using the manner of construction described.

Figure 11:
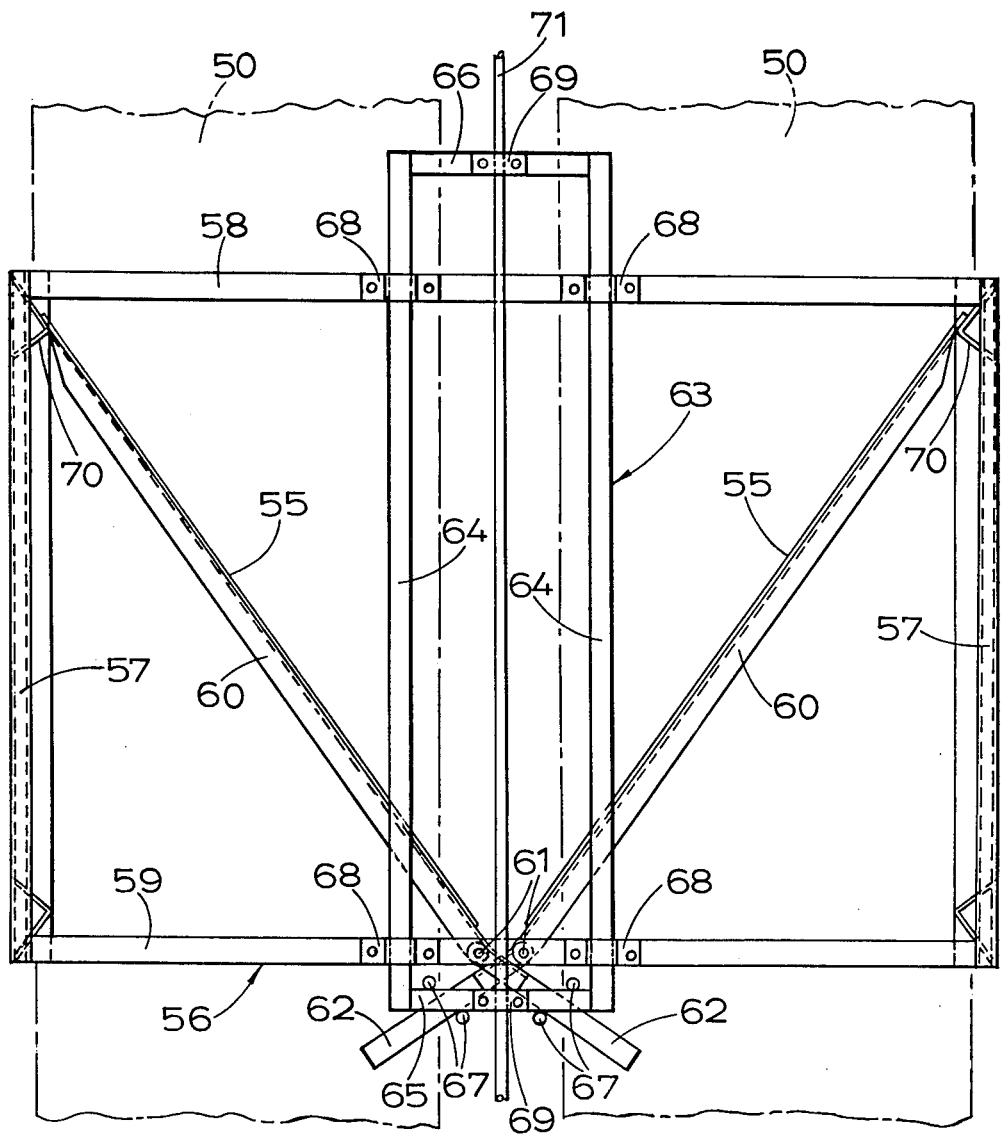
FIGS. 11 and 12 are plan views of scrapers for cleaning bird droppings from the units shown in alternative positions.
Figure 12:
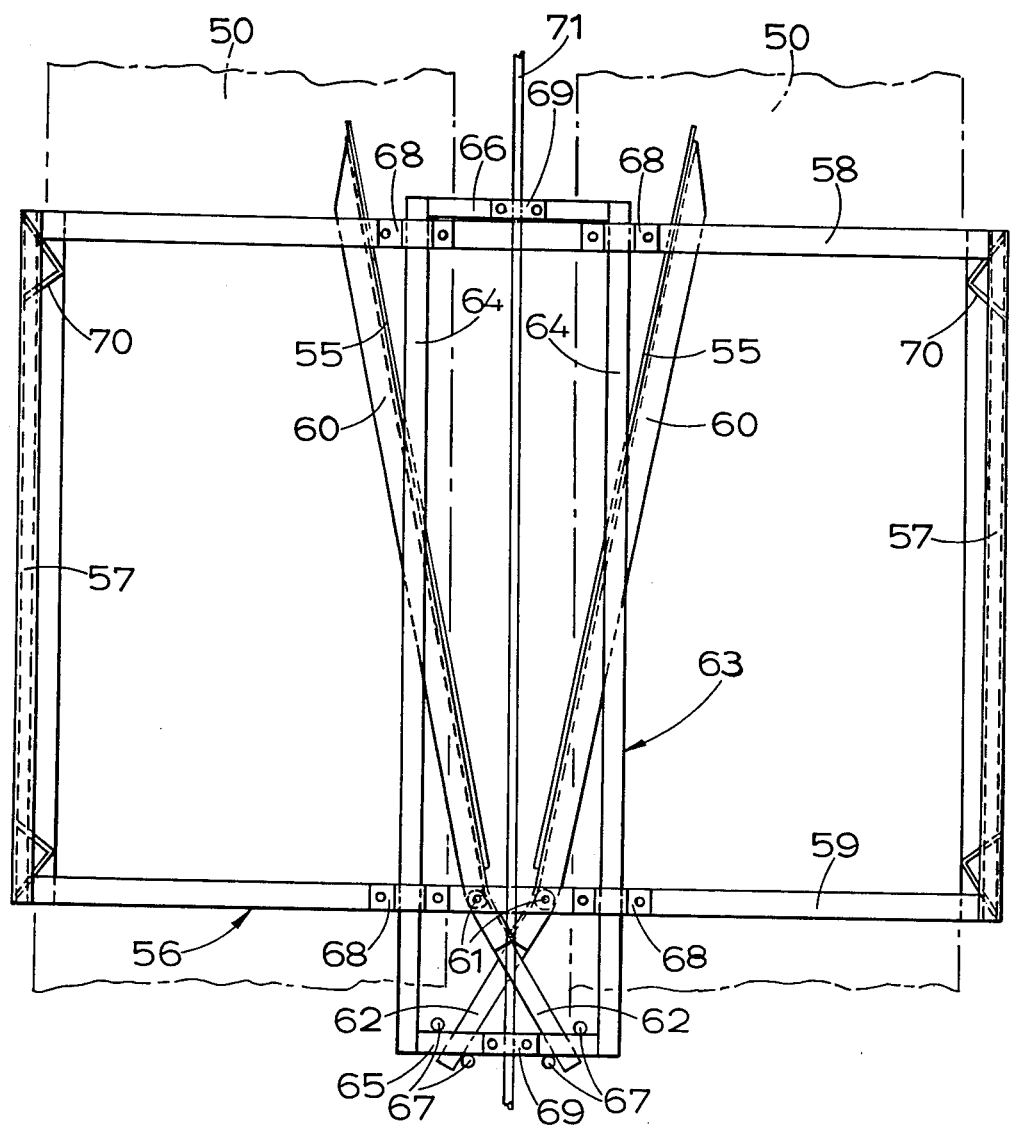

The trays 50, 51 which collect droppings from the tiers of units are cleared of the droppings by scrapers, as shown in FIGS. 11 and 12 of the accompanying drawings. The scrapers travel along the trays and as they advance they sweep the droppings over the rear longitudinal edges of the trays into the spaces between the lines of units of the tiers. Scrapers which clear droppings in this manner are known in regard to battery cage systems for egg-laying hens, and they travel continuously along the length of the runs of battery cages. However, it is generally desirable for the broiler rearing units to be deeper than battery cages, and the food for broiler birds has a greater content of fat than that fed to battery layer birds with the result that the droppings produced by the broiler birds are more glutinous than those of battery layer birds. As a result there is a tendency for the droppings to stick to the scrapers and build up in front of the scrapers if the scrapers travel continuously along the trays. This can be unsatisfactory because the cleaning may be less effective and an increased strain can be imposed on the drives of the scrapers. The problem has been overcome by arranging that the scrapers as shown in FIGS. 11 and 12 advance in steps along the trays, and at the end of each step retreat along the trays for part of the distance advanced in the step before travelling forwards again on to the next step. During the forward travel the scrapers are disposed obliquely across the trays with their ends adjacent the rear longitudinal edges of the trays trailing to encourage the droppings to be moved to and over that edge. As the scrapers retreat they are caused to swing across the trays to positions in which they are adjacent to, and preferably at least in part just beyond and extending generally lengthwise of, the rear longitudinal edges of the trays. Any droppings which have built up in front of the scrapers then fall into the space between the trays. At the commencement of the next forward movement of the scrapers they return to their oblique positions and they are in those positions by the time they move on to the next step of their forward travel along the trays.

The manner in which the aforesaid movement of the scrapers is accomplished will now be described. As shown in FIGS. 11 and 12, the scrapers, indicated at 55, for clearing the droppings from the trays, indicated as 50, serving the two units of each tier are carried by a rectangular carriage 56 which extends across the widths of the trays of the two units and the intervening space between them. The frame comprises a pair of longitudinal members 57 which extend longitudinally of the trays adjacent the front longitudinal edges of the two trays, and leading and trailing cross members 58,59 secured to and extending between the longitudinal members. The longitudinal members serve as runners which run on the trays. They extend below the level of the two cross members 58,59 by distances sufficient to accommodate the scrapers 55 below the cross members in scraping engagement with the trays. The two scrapers 55, in the form of blades disposed on edge having lateral flanges 60 along their upper edges, are pivoted near to one of their ends to and below the trailing cross member 59 at positions near to, and equally spaced at opposite sides of, the mid-point of the length of the trailing cross member. They are pivoted about vertical axes by pivot pins 61 fixed to the cross member and engaged in apertures in the lateral flanges 60. The scrapers are of a length such that they can each extend obliquely from the pivoted connection to the angle between the nearest longitudinal member 57 of the frame and the leading cross member 58, FIG. 11, which is the position the scraper occupies for forward travel along the tray. The lateral flange 60 of each scraper has an extension 62 beyond the respective pivot pin 61 which projects rearwardly of the trailing cross member at an angle to the main part of the flange. Slidably retained to and supported centrally on the leading and trailing cross members of the carriage is an activator 63. This comprises two parallel bars 64 which span and extend beyond the two cross members and are joined at their opposite ends by bridge pieces 65,66 such that the activator is of rectangular shape. Straps 68 fixed to the cross members 58,59 straddle the bars 64 and thereby slidably retain the actuator 63 to the carriage 56. Fixed to and depending from the bridge piece 65 nearest to the trailing cross member 59 are two pairs of pegs 67 near opposite ends of the bridge piece. The flange extension 62 of each scraper extends slidably between the pair of pegs 67 furthest from the scraper. A cable clamp 69 is attached to each of the bridge pieces 65. Some lost motion is allowed between the activator and the carriage longitudinally of the frame. The bridge piece 65 nearest to the leading cross member 58 of the carriage 56 is able to abut against the straps 68 on that cross member to limit rearward movement of the activator relative to the carriage, and engagement of the ends of the scrapers remote from the pivot pins 61 with abutments 70 on the longitudinal members 57 of the carriage limits forward movement of the activator relative to the carriage. The lost motion between the activator and carriage is sufficient to cause the scrapers to swing between the oblique, forward travel, positions shown in FIG. 11 and the positions shown in FIG. 12 in which they extend generally longitudinally of the carriage close to the central longitudinal axis of the carriage and vice versa. The swinging of the scrapers between the two positions results from the engagement of the flange extensions 62 of the scrapers with the pairs of pegs 67.

The activator is secured by the cable clamps 69 to a drive cable 71 which runs for the length of the units in the space between the lines of units. The cable is driven by a suitable reversible motor, not shown, which is automatically controlled to advance the cable in steps along the length of the units and to reverse for some distance between each advancing step. During advancing movement of the cable there is initially lost motion between the actuator and the carrier until the scrapers take up their oblique positions for scraping. The reverse movement of the cable is sufficient to cause the scrapers to swing to their longitudinal positions during the lost motion between the activator and the carriage. In their longitudinal positions the scrapers extend into the space between the units to allow droppings to fall from the scrapers into the space before the scrapers return to their oblique positions for scraping the trays during the next step of their forward travel.

A conveyor belt may be provided at the bottom of the spaces between the lines of units to receive the droppings cleared from the trays and take them away to a collection point.

I claim:

1. A broiler rearing unit comprising an elongate housing having walls and a floor which define a continuous elongate, accommodation space extending longitudinally of said housing and which said space is able to accommodate a plurality of birds from chicks through to maturity, is of proportions which enable the birds, at all sizes, to exercise themselves by moving their wings and moving to and fro along said accommodation space, said floor being movable longitudinally along said accommodation space and comprising a plurality of load-supporting elements having interengaging means for releasably connecting the elements end-to-end and which can be moved successively to one end of said housing where they are detachable from those of said elements remaining in said accommodation space.

2. A broiler rearing unit according to claim 1 wherein said load-supporting elements have parts which bridge the ends of adjacent said elements to prevent birds from being trapped between adjacent said elements, and are shaped to discourage birds from sitting across the ends of adjacent said elements.

3. A broiler rearing unit according to claim 1 wherein each said load-supporting element has a rigid framework and a perforate supporting surface which is of flexible material and is supported in tension on said framework.

4. A broiler rearing unit according to claim 3 wherein a tray is supported directly below said floor to collect bird droppings which fall through said perforations in said load-supporting elements, and a scraper is provided which travels along said tray to clear the droppings from said tray.

5. A broiler rearing unit according to claim 3 wherein said perforate supporting surface is formed by a substantially planar rectangular plastics mat which is perforate.

6. A broiler rearing unit according to claim 5 wherein said mat of each said load-supporting element is a moulding having depending flanges at opposite sides and said framework has side members to which said depending flanges are secured to secure said mat to said framework.

7. A broiler rearing unit according to claim 1 wherein said interengaging means are constructed and arranged to be separable to enable any one of said elements to be detached from the remaining said elements of said floor by movement of said one element out of the plane of the remaining said elements.

8. A broiler rearing unit according to claim 7 wherein said load-supporting elements have hooks and complementary keepers at their opposite ends and said elements are interconnected by engagement of their said hooks with said keepers of adjacent said elements of said floor.

9. A broiler rearing unit according to claim 8 wherein said hooks are adapted to engage with said keepers such that limited play is possible between said hooks and keepers, the arrangement being such that by initially assembling said load-supporting elements as closely together to form said floor as the play between said engaging hooks and keepers will allow, upon subsequently applying drive to said floor at the end thereof towards which said elements are successively to be moved the play between said hooks and keepers is progressively taken up and there is an initial delay before said floor as a whole starts to move.

10. A broiler rearing unit comprising an elongate housing having walls and a floor which define a continuous elongate, accommodation space extending longitudinally of said housing and which said space is able to accommodate a plurality of birds from chicks through to maturity, is of proportions which enable the birds, at all sizes, to exercise themselves by moving their wings and moving to and fro along said accommodation space, said floor being movable longitudinally along said accommodation space and comprising a plurality of load-supporting elements connected end-to-end by releasable connections and which can be moved successively to one end of said housing where they are detachable from those of said elements remaining in said accommodation space, each load-supporting element having a rigid framework and a perforate supporting surface formed by a substantially planar rectangular flexible plastics mat which is perforate and is supported in tension on said framework, said framework of each said load-supporting element comprising side bearers extending longitudinally of said floor, cross bearers extending transversely between and secured to said side bearers at opposite ends of said mat and at intermediate positions between the ends of said mat, an intermediate bearer extending longitudinally of said mat and connected to said cross bearers, and bracing bearers extending diagonally between said side bearers and said cross bearers at the ends of said mat, and said mat having depending flanges at opposite sides which are secured to said side bearers thereby securing said mat to said framework.

11. A broiler rearing unit comprising an elongate housing having walls and a floor which define a continuous elongate, accommodation space extending longitudinally of said housing and which said space is able to accommodate a plurality of birds from chicks through to maturity, is of proportions which enable the birds, at all sizes, to exercise themselves by moving their wings and moving to and fro along said accommodation space, said floor being movable longitudinally along said accommodation space and comprising a plurality of load-supporting elements connected end-to-end by releasable connections and which can be moved successively to one end of said housing where they are detachable from those of said elements remaining in said accommodation space, drive means being provided at a position along the length of said floor which drivingly engages with whichever of said load-supporting elements is at said position in said floor, the drive transmitted to that said element by said drive means being transmitted to the other said elements of said floor through said releasable connections of said elements to move those other said elements along with said driven element, and each said load supporting element in turn as it reaches said position being drivingly engaged by said drive means so that said floor is thereby moved along said accommodation space.

12. A broiler rearing unit according to claim 11 wherein said drive means comprises a pair of parallel driven endless chains spaced apart laterally of said floor which extend longitudinally of said floor, and dogs carried by said chains, and said load-supporting elements are each constructed and arranged to co-operate with said dogs to be driven along with said chains when said element is at said position along the length of said floor.

13. A broiler rearing unit comprising an elongate housing having walls and a floor which define a continuous elongate, accommodation space extending longitudinally of said housing and which said space is able to accommodate a plurality of birds from chicks through to maturity, is of proportions which enable the birds, at all sizes, to exercise themselves by moving their wings and moving to and fro along said accommodation space, said floor being movable longitudinally along said accommodation space and comprising a plurality of load-supporting elements connected end-to-end by releasable connections and which can be moved successively to one end of said housing where they are detachable from those of said elements remaining in said accommodation space, said housing being assembled from a series of front wall sections constructed from wire and having depending locating parts, upright supports on which said front wall sections are located side-by-side to form a continuous front wall of said housing, a series of substantially rectangular cross frame sections also constructed from wire and having depending locating parts whereby they are located on said supports transversely of said front wall sections, and back, top and end wall forming means, said cross frame sections being constructed and arranged to provide support for said floor and for said back, top and end wall forming means whilst leaving the interior of said housing open so that said accommodation space extends continuously along the length of said housing.

14. A broiler rearing unit according to claim 13 wherein the front wall sections and cross frame sections have upstanding locating parts and upper supports are provided above said sections which are engaged by said upstanding locating parts, and a similarly assembled housing is provided above said housing including front wall sections and cross frame sections having depending locating parts which engage with said upper supports.

15. A broiler rearing unit according to claim 13 wherein said cross frame sections have wires defining vertically extending openings which receive and locate one or more panels of sheet material which form said back wall of said housing.

16. A broiler rearing unit according to claim 13 wherein said cross frame sections include wire members which support and locate runners which support said load-supporting elements of said floor and guide them in their movement along said housing.

17. A broiler rearing unit according to claim 13 wherein said cross frame sections are constructed and arranged to form part also of the assembly of a similarly constructed housing extending parallel to said housing in back-to-back relationship therewith.

18. A broiler rearing unit according to claim 13 wherein said front wall sections comprise vertically and horizontally barred structures on which wire gates are hung by which access can be gained into said accommodation space from the front of said housing.

19. A broiler rearing unit comprising an elongate housing having walls and a floor which define a continuous elongate, accommodation space extending longitudinally of said housing and which said space is able to accommodate a plurality of birds from chicks through to maturity, is of proportions which enable the birds, at all sizes, to exercise themselves by moving their wings and moving to and fro along said accommodation space, said floor being movable longitudinally along said accommodation space and comprising a plurality of load-supporting elements connected end-to-end by releasable connections and which can be moved successively to one end of said housing where they are detachable from those of said elements remaining in said accommodation space, each said load-supporting element having a rigid framework and a perforate supporting surface which is of flexible material and is supported in tension on said framework, a tray being supported directly below said floor to collect bird droppings which fall through said perforations in said load-supporting elements, and a scraper being provided which is adapted to clear the droppings from said tray over a longitudinal edge of said tray, which advances in steps along said tray, which at the end of each said step retreats along said tray for part of the distance advanced in said step before travelling forward again on to the next said step, and which is constructed and arranged to move between a first position which it occupies during its advancing travel in each said step and in which it extends obliquely across said tray to encourage droppings to be moved to the said longitudinal edge of said tray, and a second position to which it is moved during said retreating travel and in which said scraper extends generally longitudinally of said tray adjacent to said longitudinal edge to allow droppings to fall from said scraper over said edge.

20. A broiler rearing unit according to claim 19 wherein a drive element extends longitudinally of said tray and is movable longitudinally of said tray in a series of advancing steps between each of which there is some reversing movement, a carriage runs on said tray and carries said scraper, and an activator is mounted on said carriage for limited movement relative to said carriage longitudinally of said tray, said scraper being pivoted to said carriage about a pivotal axis normal to said tray for angular movement between said first and second positions, said activator being fixed to said drive elements, and said scraper having a connection to said activator spaced from said pivotal axis, whereby during movement of said activator with said drive element relative to said carriage and scraper is caused to be moved angularly about the pivotal axis between said positions, said carriage being caused to move with said activator when the limit of the movement of said activator relative to said carriage is reached.

* * * * *